United States Patent
Finkelstein

(10) Patent No.: US 9,866,485 B2
(45) Date of Patent: Jan. 9, 2018

(54) REROUTING NETWORK TRAFFIC FLOWS BASED ON SELECTION CRITERIA

(71) Applicant: Cox Communications, Inc., Atlanta, GA (US)

(72) Inventor: Jeffrey L. Finkelstein, Atlanta, GA (US)

(73) Assignee: Cox Communication, Inc., Atlanta, GA (US)

( * ) Notice: Subject to any disclaimer, the term of this patent is extended or adjusted under 35 U.S.C. 154(b) by 151 days.

(21) Appl. No.: 15/002,604

(22) Filed: Jan. 21, 2016

(65) Prior Publication Data
US 2017/0214623 A1  Jul. 27, 2017

(51) Int. Cl.
*H04L 12/803* (2013.01)
*H04L 29/06* (2006.01)
*H04L 12/707* (2013.01)
*H04L 12/26* (2006.01)

(52) U.S. Cl.
CPC .......... *H04L 47/122* (2013.01); *H04L 43/103* (2013.01); *H04L 45/22* (2013.01); *H04L 69/22* (2013.01)

(58) Field of Classification Search
None
See application file for complete search history.

(56) References Cited

U.S. PATENT DOCUMENTS

| | | | |
|---|---|---|---|
| 7,996,718 B1 * | 8/2011 | Ou | G06F 11/0727 714/23 |
| 8,122,120 B1 * | 2/2012 | Athreya | G06F 11/2005 370/230 |
| 8,310,935 B1 * | 11/2012 | Chakravorty | H04L 45/22 370/218 |
| 9,253,096 B2 * | 2/2016 | Chrysos | H04L 47/115 |

* cited by examiner

*Primary Examiner* — Anh Ngoc Nguyen
(74) *Attorney, Agent, or Firm* — Eversheds Sutherland (US) LLP

(57) ABSTRACT

Systems, methods, and apparatus for rerouting network traffic flows based on selection criteria are provided. Routers forming data flow paths between network devices in a network may be polled. In response to the poll, network status information may be received from the routers. Based at least in part on the received status information, a rerouting event associated with a first data flow over a first data flow path may be received. Based on one or more selection criteria, a second data flow path may be selected for the first data flow. The first data flow may then be rerouted over the second data flow path.

21 Claims, 4 Drawing Sheets

REROUTING NETWORK TRAFFIC FLOWS BASED ON SELECTION CRITERIA

BACKGROUND

A wide variety of service providers, such as cable providers and satellite providers, provide broadband communications services, such as video services, data services, and voice services to various user devices at a customer premise location. These services are typically provided by a service provider network utilizing various routers and/or other network devices to route service data traffic to the user devices. In this configuration, routing (or rerouting) decisions are made locally by routers that do not have an awareness of service level requirements associated with the type of data being transmitted in the service provider network. For example, in response to network congestion, a router may reroute video data onto a traffic path only suitable for web data. As a result, service requirements that may be associated with the transmission of video data may be compromised thereby increasing the cost of sending this data to customers.

DETAILED DESCRIPTION

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers refer to like elements, but not necessarily the same elements, throughout.

Embodiments of the disclosure may include rerouting network traffic flows based on selection criteria. Routers that form data flow paths between network devices in a network may be polled. In response to the poll, network status information may be received from the routers. Based at least in part on the received status information, a rerouting event associated with a first data flow over a first data flow path may be received. Based on one or more selection criteria, a second data flow path may be selected for the first data flow. The first data flow may then be rerouted over the second data flow path. The second data flow path, or portions thereof, may be communicated to one or more of the routers and/or other networking equipment that may route data via the second data flow path.

The above description of example implementations is for purposes of illustration and is not meant to be limiting. Although each of these implementations is described in greater detail below, such descriptions are also not meant to be limiting. Other descriptions, examples, etc., may also exist.

Figure 1:
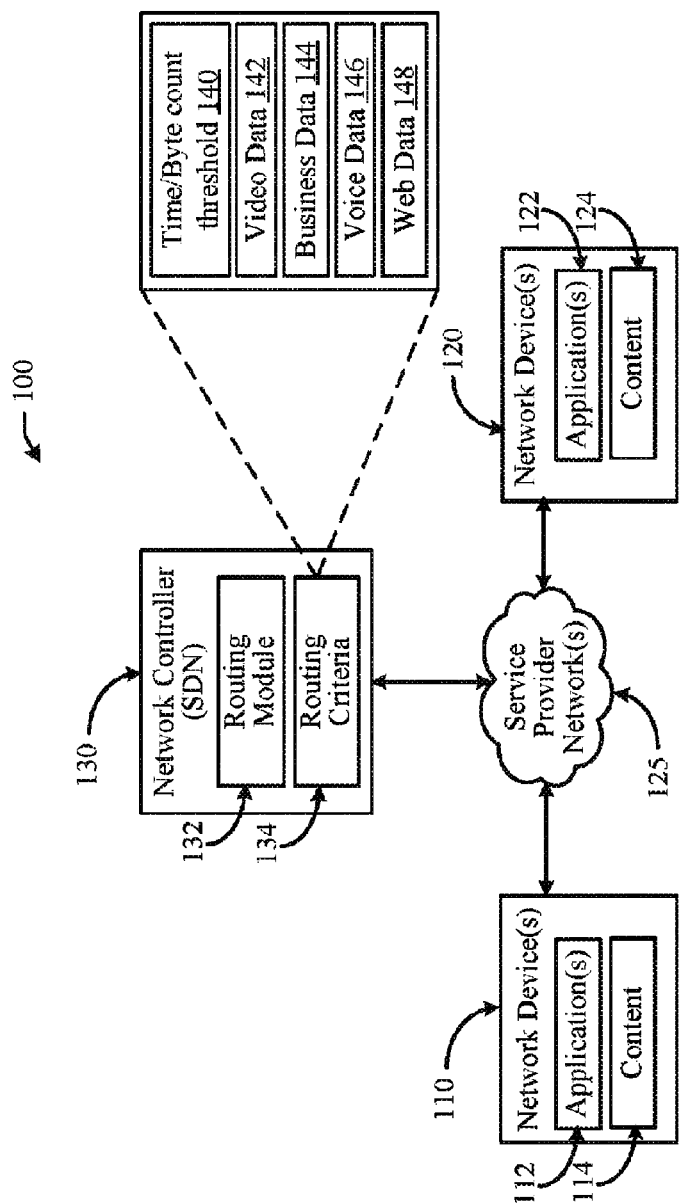
FIG. 1 illustrates an example network that includes devices configured to reroute network traffic flows based on selection criteria, according to an embodiment of the disclosure.

FIG. 1 depicts an example architecture 100 that may include, but is not limited to, one or more network devices 110 (hereinafter referred to as the network device 110), one or more network devices 120 (hereinafter referred to as the network device 120) and a network controller 130. The network devices 110 and 120 and the network controller 130 may be in communication with one or more service provider networks 125. The network devices 110 and 120 may be located at a customer premise location.

In some embodiments, the network devices 110 and 120 may be suitable devices or components that facilitate the receipt, processing, and/or output of at least one broadband signal, such as a broadband cable signal or a broadband satellite signal. In certain embodiments, the network devices 110 and 120 may be a customer premise device or component that is situated within a customer's household or other structure associated with the customer. The network devices 110 and 120 may include suitable hardware and/or software components capable of receiving and processing a broadband signal (e.g., a cable signal, satellite signal, etc.) received over the service provider network(s) 125, such as a cable service provider network or a satellite service provider network. Examples of suitable components may include, but are not limited to, a set-top box ("STB") (e.g., a cable STB, a digital satellite STB, an Internet Protocol Television STB, etc.), a virtual STB, an embedded STB, etc. Other example of the network devices 110 and/or 120 may include tablet computing devices, laptop computers, desktop computers, smartphones, wearable devices, combinations thereof, or the like. The network devices 110 and 120 may further include one or more applications 112 and 122, respectively. The applications 112 and 122 may be software components utilized for sending and/or receiving content 114 and 124 over the service provider network(s) 125 between the network devices 110 and 120.

For example, the applications 112 and 122 may include, without limitation, video streaming applications for communicating video (and associated audio) data, voice over IP (VoIP) applications for communicating voice data, and web (i.e., Internet) applications for communicating web or business data. In certain embodiments, one of the network devices (e.g., the network device 120) may be associated with the service provider network(s) 125 for providing content to a customer network device (e.g., the network device 110). For example, the network device 110 may be configured to receive a broadband signal from the service provider network(s) 125 that may include a wide variety of data components, including but not limited to, a television signal, a digital television signal, data associated with a VoIP telephone service, data associated with Internet service, data associated with business services, etc. The network device 110 may receive and process the broadband signal. The network device 110 may selectively output a portion of the broadband signal, such as digital television data (e.g., audio and/or video data), electronic program guide data, various Web pages, etc., to a display device (not shown) for display. Any number of suitable connections and/or connecting devices, such as coaxial cables, High-Definition Multimedia Interface ("HDMI") cables, etc., may be utilized to connect the network device 110 to the aforementioned display device.

In some embodiments, the network devices 110 and 120 may receive a broadband data signal and/or content via any number of suitable service provider network(s) 125, such as a cable network that includes any number of optical fibers, coaxial cables, and/or cable drops, a satellite network that includes a suitable satellite dish and/or connecting cables, and/or other suitable networks. Additionally, any number of intermediary devices, such as broadband modems, routers, etc., may be situated between each of the network devices 110 and 120 and the service provider network(s) 125.

With continued reference to FIG. 1, the network controller 130 may include a routing module 132 and routing criteria 134. The network controller 130 may be configured to receive router status information and control the operation of routers in the service provider network(s) 125. The network controller 130 may utilize the routing module 132 to route (and/or reroute) network traffic flows based on the routing criteria 134. The routing criteria 134 may include various metrics for making alternate path selections (e.g., by selecting an optimum network traffic path) when rerouting data through the service provider network(s) 125 between the network devices 110 and 120. In one embodiment, the routing criteria 134 may be based on a time/byte count threshold 140. For example, the routing module 132 may be configured to use one path for creating a data flow and then reroute the data flow upon reaching a certain time/byte count threshold (e.g., >100,000 data packets over a two hour time period). In example embodiments, the network controller 130 may approximately distribute across various data pathways according to the dataflow capacity of each of the various data pathways. In other embodiments, the routing criteria 134 may be based on a type of data flow such as video data 142, business data 144, voice data 146, and web data 148. For example, the routing module 132 may be configured to reroute a data flow containing video data only onto alternate data flow paths optimized for transmitting video data. Thus, the network controller 130 may attempt to reroute data flow on a pathway that may be optimized for that data flow, before rerouting to pathways that may be optimized for other data types and/or data streams.

It should be understood that in accordance with embodiments of the disclosure, the network controller 130 may be configured to be aware of network capacity, bandwidth, and traffic associated with the flow of data over the service provider network(s) 125 as well as to determine a cost associated with the transmission of data. Specifically, the network controller 130 may be configured to determine a least costly network traffic or data flow path (comprised of one or more routers) for communicating data between the network devices 110 and 120. For example, if the network device 110 is in the process of sending video data to the network device 120 over the service provider network(s) 125 and among two available network traffic paths, only one network traffic path is configured to carry video data (e.g., the network traffic path is subject to a service load agreement (SLA) that includes specific performance benchmarks for the transmission of video data), then the network controller 130 may determine that the network traffic path configured to carry video data (i.e., the optimum traffic path) has the least cost with respect to the other available network traffic path. However, in other cases, if there is relatively high levels of congestion on the path configured to carry video data, then the network controller 130 may identify an alternate pathway that provides a relatively low cost transmission of data. It will be appreciated that cost, as discussed herein, may entail any variety of metrics associated with transmitting data between network devices 110, 120 via the service provider network(s). These metrics may include cost per bit, data latency cost, data bandwidth cost, customer satisfaction cost, combinations thereof, or the like.

In accordance with an embodiment of the disclosure, the network controller 130 may comprise a software-defined networking (SDN) module that performs at least the above-described functions of the network controller 130. As should be appreciated by those skilled in the art, SDN is an approach to computer networking that allows network administrators to manage network services through abstraction of higher-level functionality. This is accomplished by decoupling the system that makes decisions about where traffic is sent (the control plane) from the underlying systems that forward traffic to the selected destination (the data plane). In one embodiment, communication between the control plane and the data plane may be accomplished through the use of a protocol such as OpenFlow. As known to those skilled in the art, OpenFlow is a communications protocol that gives access to the forwarding plane of a network switch or router over the network. The OpenFlow protocol is layered on top of the Transmission Control Protocol (TCP), and prescribes the use of Transport Layer Security (TLS). Specifically, the OpenFlow protocol enables controllers to determine the path of network packets through a network of switches or routers. The separation of the control plane from the forwarding plane allows for more sophisticated traffic management than is feasible using access control lists (ACLs) and routing protocols. The OpenFlow protocol also allows remote administration of a layer 3 switch's or router's packet forwarding tables, by adding, modifying and removing packet matching rules and actions. It will be appreciated that in other example embodiments, any other suitable protocols may be employed for the purposes of control plane-to-data plane and/or data plane-to-control plane communications. In this manner, routing decisions may be made periodically or ad hoc by the network controller 130 and translated into rules and actions with a configurable lifespan, which are then deployed to a switch or router's flow table, leaving the actual forwarding of matched packets to the switch or router at wire speed for the duration of those rules. Packets which are unmatched by the switch or router may be forwarded to the controller. The network controller 130 can then decide to modify existing flow table rules on one or more switches/routers or to deploy new rules, to prevent a structural flow of traffic between switch/router and controller. The controller may even decide to forward the traffic itself, provided that it has told the switch or router to forward entire packets instead of just their header.

It should be understood however, that other SDN protocols may also be utilized in accordance with embodiments of the disclosure. Other protocols which may be utilized include, without limitation, Border Gateway Protocol (BGP), NETCONF, Extensible Messaging and Presence Protocol (XMPP), Open vSwitch Database Management Protocol (OVSDB), and MPLS Transport Profile (MPLS-TP).

Figure 2:
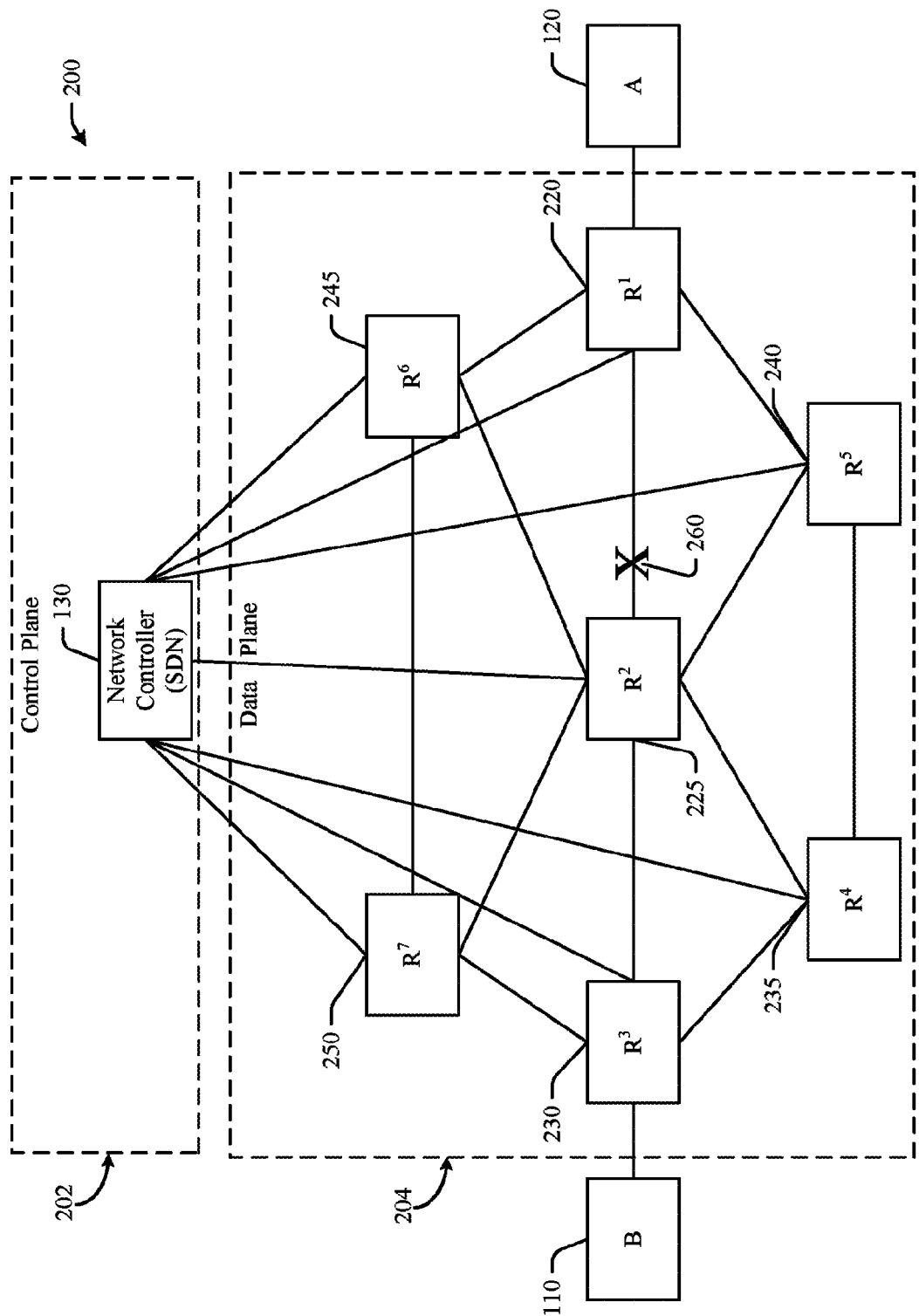
FIG. 2 illustrates a block diagram of a network controller rerouting network traffic flows based on selection criteria, according to an embodiment of the disclosure.

FIG. 2 illustrates a block diagram of a network 200 that includes a network controller for rerouting network traffic flows based on selection criteria, according to an embodiment of the disclosure. The network 200 includes a control plane 202, a data plane 204, and network devices 110 and 120. The control plane 202 may include a network controller 130. As discussed above with respect to FIG. 1, the network controller 130 may comprise a software-defined networking (SDN) module utilized to perform a number of functions including routing and/or rerouting network traffic flows based on various selection criteria. The data plane 204 may comprise routers 220, 225, 230, 235, 240, 245 and 250. The routers 220-250 may be utilized to form multiple data flow paths for communicating network traffic (e.g., data packets) between the network devices 110 and 120. The network controller 130 may be in communication with each of the routers 220-250 and may be configured to reroute the flow of data over an alternate data flow path upon the occurrence of a rerouting event such as a loss of connectivity between two or more routers. In particular, as described above with respect to FIG. 1, the network controller 130 may be configured for dynamic, periodic, polled, and/or continuous monitoring of each of the routers 220-250 which form the data flow paths in the data plane 204.

For example, a data flow path between the network devices 110 and 120 in the network 200 may include the routers 230, 225, and 220 (i.e., the shortest or least costly path between the network devices 110 and 120). The aforementioned data flow path may be represented as follows: $B-R^3-R^2-R^1-A$. Upon a loss of connectivity between the routers 220 and 225 (as shown by the indicator 260), the network controller 130 may create or utilize a new data flow path for the data flow that includes the routers 230, 235, 240, and 220. This new data flow path may be represented as follows: $B-R^3-R^4-R-^5R^1-A$. In some embodiments, the new data flow path may represent a second least costly path between the network devices 110 and 120. As discussed above with respect to FIG. 1, the network controller 130 may determine the cost of a data flow path based on a number of criteria including, but not limited to, a time/byte count threshold associated with a first data flow path and a data transmission type. In some embodiments, the data transmission type, which may be determined from a packet header for a data packet in a first data flow, may include video data, web data, business data, or voice data. It should be understood that the network controller 130 may be configured to select any combination of data flow paths based on the aforementioned criteria.

Figure 3:
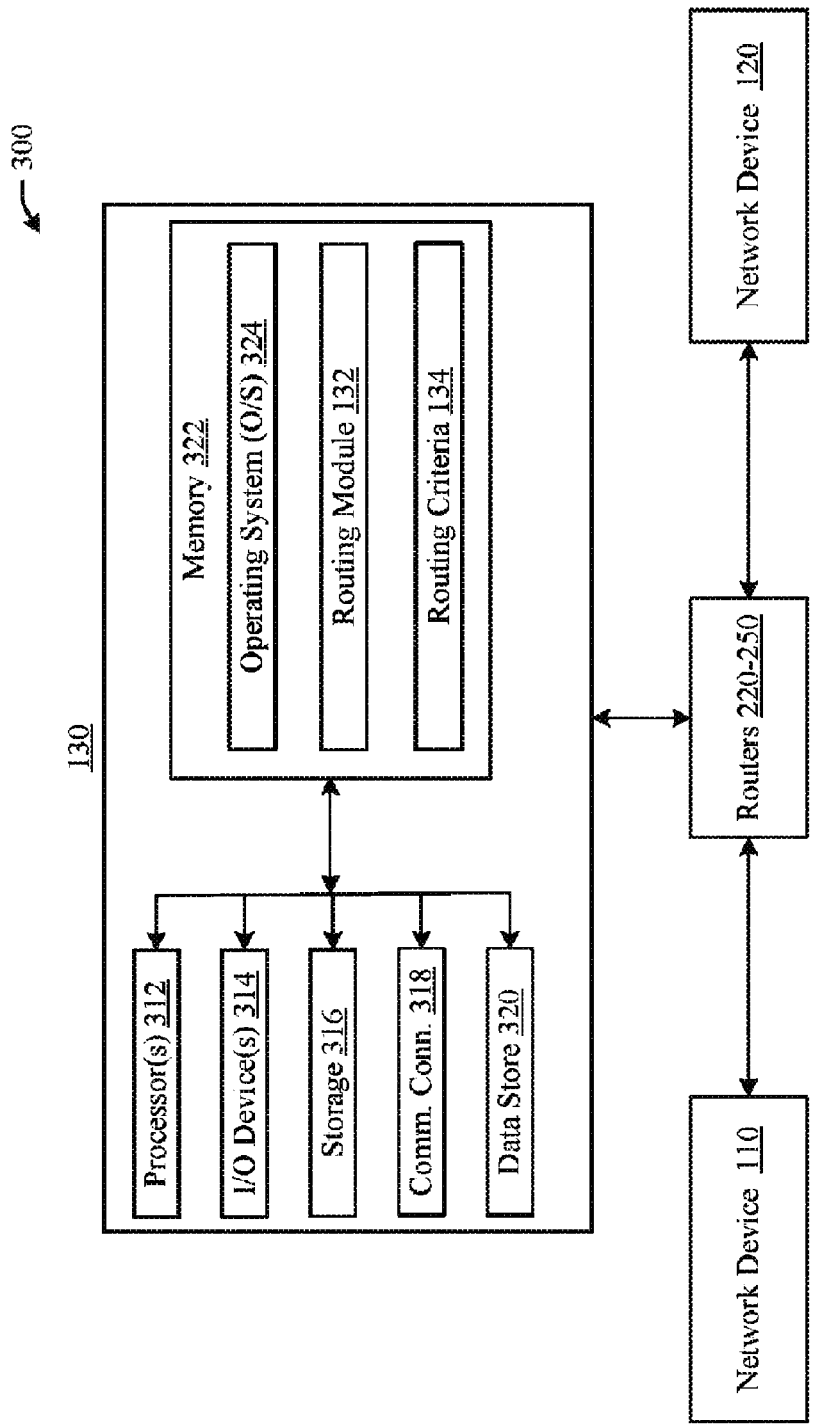
FIG. 3 illustrates an example computing environment for implementing network traffic flow rerouting based on selection criteria, according to an embodiment of the disclosure.

FIG. 3 illustrates an example computing environment for implementing network traffic flow rerouting based on selection criteria, according to an embodiment of the disclosure. The computing environment includes the network controller 130, routers 220-250, and the network devices 110 and 120. The network controller 130 may include one or more processors configured to communicate with one or more memory devices and various other components or devices. For example, the network controller 300 may include one or more processors 312 that are configured to communicate with one or more memory or memory devices 322, one or more input/output (I/O) devices 314, storage 316, one or more communication connections 318, and one or more data stores 320. The processor 312 may be implemented as appropriate in hardware, software, firmware, or a combination thereof. It should be understood that the routers 220-250 and the network devices 120 and 110 may each include the same or at least similar components as the network controller 130.

The memory 322 of the network controller 130 may store program instructions that are loadable and executable on the processor 312, as well as data generated during the execution of these programs. Depending on the configuration and type of the network controller 130, the memory 322 may be volatile, such as random access memory (RAM), and/or non-volatile, such as read-only memory (ROM), flash memory, etc. The storage 316 of the network controller 130 may include removable and/or non-removable storage including, but not limited to, magnetic storage, optical disks, and/or tape storage. The disk drives and their associated computer-readable media may provide non-volatile storage of computer-readable instructions, data structures, program modules, and other data for the computing devices.

The memory 322 and the storage 316, both removable and non-removable, are all examples of computer-readable storage media. For example, computer-readable storage media may include volatile and non-volatile, removable and non-removable media implemented in any method or technology for storage of information such as computer-readable instructions, data structures, program modules, or other data. In some implementations, the memory 322 may include multiple different types of memory, such as static random access memory (SRAM), dynamic random access memory (DRAM), or ROM.

The one or more communication connections 318 may allow the network controller 130 to communicate with other devices, such as each of the routers 220-250, which may reside in the service provider network(s) 125.

The I/O devices 314 may enable a user to interact with the network controller 130. Such I/O devices 314 may include, but are not limited to, a keyboard, a mouse, a pen, a voice input device, a touch input device, a gesture capture or detection device, a display, a camera or imaging device, speakers, or a printer.

The data stores 320 may store lists, arrays, databases, flat files, etc. In some implementations, the data stores 320 may be stored in memory external to the network controller 130. The data stores 320 may store information that may facilitate rerouting network traffic flows based on selection criteria, as described herein. In some embodiments, all or at least a portion of such information may be stored in the data stores 320, while at least another portion of the information may be stored in one or more databases or other storage mechanisms, whether local or remote from the network controller 130.

Turning to the contents of the memory 322, the memory 322 may include an operating system 324 and various software applications, modules and/or data that may implement or facilitate the processes described herein. Example modules and data may include, but are not limited to, a routing module 132 and a routing criteria 134. Each of the aforementioned modules may be implemented as individual modules that provide specific functionality associated with the processes implemented or facilitated herein by the network controller 130. Alternatively, one or more of the modules may perform all or at least some of the functionality associated with the other modules.

The operating system 324 may refer to a collection of software that manages computer hardware resources and provides common services for computer programs to enable and facilitate operation of such programs.

The routing module 132 may configure the network controller 130 to communicate with the routers 220-250 shown in FIG. 2, as described above. For example, the routing module 132 may communicate (i.e., poll) a request for network status information from the routers 220-250 and receive network status information from the routers 220-250. The routing module 132 may also be configured to send instructions or commands to the routers 220-250 to reroute a first data flow over another data flow path in response to the detection of a rerouting event based on the received network status information and based on the routing criteria 134.

As discussed above, the routing module 132 may implement various communication protocols to enable communication with the routers 220-250 shown in FIG. 2. Example protocols may include the various SDN protocols discussed above in FIG. 2, which may include OpenFlow, BGP, NETCONF, XMPP, OVSDB, and MPLS-TP.

Figure 4:
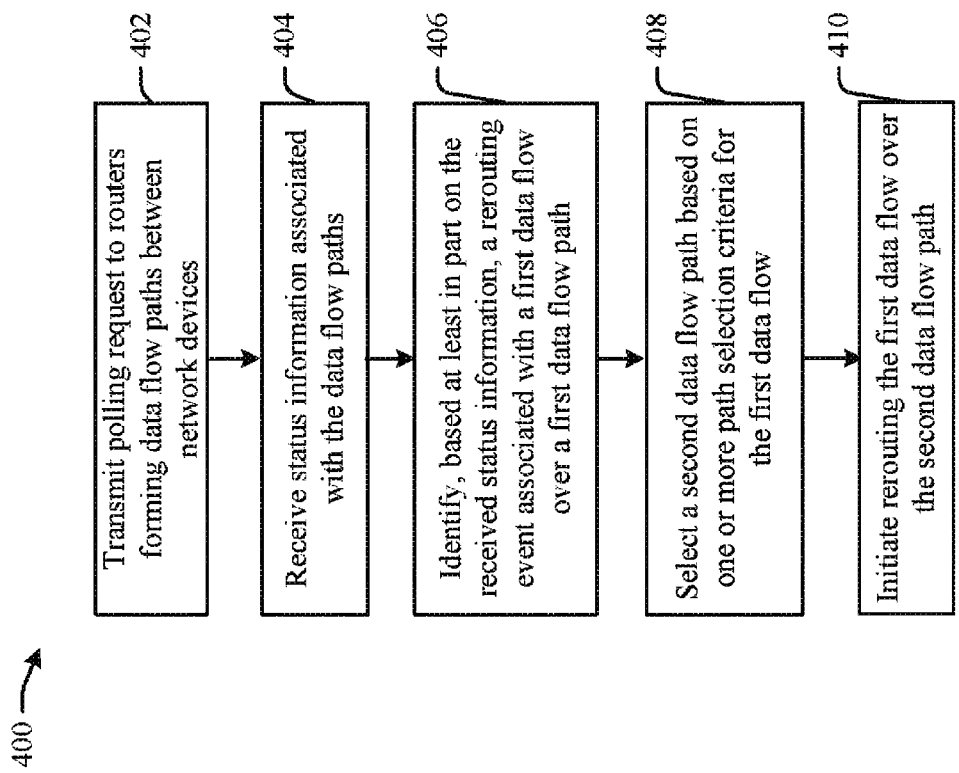
FIG. 4 is a flow diagram of one example method for rerouting network traffic flows based on selection criteria, according to an embodiment of the disclosure.

FIG. 4 illustrates a flow diagram of an example method 400 that may be performed by a network controller, such as the network controller 130 illustrated in FIGS. 1-3, to reroute network traffic flows based on selection criteria, according to an embodiment of the disclosure. The operations of the method 400 may be performed by the routing module 132 in the network controller 130. The method 400 may begin at block 402.

At block 402, the routing module 132 may transmit a polling request to one or more of the routers 220-250 that form data flow paths between the network devices 110 and 120. In an embodiment, the polling of the routers 220-250 may be based on one or more of a network device type, a network connection type, one or more data packets, a network user, a network application, a network service, or a network protocol. In some example, embodiments, only a subset of the routers 220-250 may be polled. For example, routers 220-250 that may generally be reconfigured relatively less frequently may also be polled at a relatively lower frequency compared to other routers 220-250 that may rerouting instructions occurring more frequently.

At block 404, the routing module 132 may receive network status information from each, or a subset of, of the routers 220-250, responsive to the poll operation performed at block 402. The network status information may include, for example, an indication of network congestion caused by a loss of connectivity (e.g., dropped data packets) between two routers forming a data flow path between the network devices 110 and 120. The network status information may also include a first time/byte count from one of the routers 220-250. Network congestion may also be determined based on a determination that data communicated over a data flow path does not conform to an existing service level agreement (SLA) for a particular data type (e.g., when a first data flow fails to meet specific performance benchmarks to which actual performance is periodically compared).

At block 406, the routing module 132 may identify, based at least in part on the network status information received as a result of the operation performed at block 404, a rerouting event associated with a first data flow over a first data flow path. As discussed above, the rerouting event may include a network congestion event caused by a loss of connectivity (e.g., dropped data packets) between two routers forming a data flow path between the network devices 110 and 120. Other examples of rerouting events may include relatively high levels (e.g., unusually high levels, and/or levels nearing or exceeding datalink bandwidth capacity) of data transfers between one or more routers. Such rerouting events, regardless of the cause thereof, may slow down, block, or otherwise result in degradation of data transmission between one or more links of the network.

At block 408, the routing module 132 may select a second data flow path, based on one or more path selection criteria in the routing criteria 134, for the first data flow. It should be understood that the routing criteria 134 may include a determination (performed by the routing module 132 in the network controller 130) of least costly alternative data flow paths for communicating data between the network devices 110 and 120. These alternative data flow paths may further represent lower cost data flow paths as they will not need to be managed once created by the network controller 130. In one embodiment, the path selection criteria may include a time/byte count threshold associated with the first data flow path. In particular, the routing module 132 may be configured to reroute data from the first data flow path based on a comparison of a first time/byte count to a time/byte count threshold associated with the first data flow path. In another embodiment, the path selection criteria may be a particular data transmission type associated with the first data flow over the first data flow path. Example data transmission types may include general content or specific content such as video data, web data, business data, and voice data. In one embodiment, the routing module 132 may determine the data transmission type from a packet header for a data packet in the first data flow.

At block 410, the routing module 132 may initiate rerouting the first data flow over the second data flow path selected as a result of the operation performed at block 408. As discussed above, it should be understood that the second data flow path may represent the least costly (or optimum) data flow path for the first data flow being transmitted between the network devices 110 and 120. For example, rerouting the first data flow over the second data flow path may result in reduced latency compared to routing the first data flow over the first data flow path. The rerouting instructions for the various routers in the second data flow path may be communicated to each of the routers.

The operations described and shown in the method 400 of FIG. 4 may be carried out or performed in any suitable order as desired in various embodiments of the invention. Additionally, in certain embodiments, at least a portion of the operations may be carried out in parallel. Furthermore, in certain embodiments, less than or more than the operations described in FIG. 4 may be performed.

It will be appreciated that the systems, methods, apparatus, and computer-readable medium/media, as described herein, may result in relatively more efficient data traffic rerouting. In example embodiments, lower cost routing, greater equipment utilization, and/or reduced service disruptions may result from the data network topology, as discussed herein. It will be appreciated that by having a control plane and a data plane, where the control plane has a more holistic view of the data network, better decisions may be made in how to route network traffic and/or reroute network traffic when a disruption is encountered in one or more points of the data network. If routing decisions are made in an ad hoc fashion, such as at each individual router, then that router may not have complete information (e.g., beyond the next node or a few nodes downstream) of network health or disruption that may be present in a data pathway. By employing a network controller that may poll individual routers and/or nodes of the data network, the network controller may have a richer set of information about the general health of a wider spatial and/or temporal range of the data network. This information may then be employed to make decisions of how to route and/or reroute data between two or more user devices and/or network devices.

Various block and/or flow diagrams of systems, methods, apparatus, and/or computer program products according to example embodiments of the invention are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

According to example embodiments of the disclosure, there may be a system. The system may include at least one memory for storing computer-executable instructions, one or more processors configured to access the at least one memory and execute the computer-executable instructions to: transmit a polling request to a plurality of routers forming a plurality of data flow paths between a plurality of network devices in a network; responsive to the polling request, receive status information from one or more of the plurality of routers; identify, based at least in part on the received status information, a rerouting event associated with a first data flow over a first data flow path among the plurality of data flow paths; select a second data flow path from among the plurality of data flow paths, based on one or more path selection criteria, for the first data flow; and initiate rerouting the first data flow over the second data flow path. In example embodiments, routing the first data flow over the second data flow path results in reduced latency compared to routing the first data flow over the first data flow path. In further example embodiments, the rerouting event may be a network congestion event. In still further example embodiments, the status information may include a first time/byte count from a first router of the plurality of routers and the one or more path selection criteria may include comparing the first time/byte count to a time/byte count threshold associated with the first data flow path. In some further example embodiments, the one or more path selection criteria may include a data transmission type associated with the first data flow. In some further example embodiments, the data transmission type may be determined from a packet header for a data packet in the first data flow. In some further example embodiments, the data transmission type comprises at least one of video data, web data, business data and voice data.

According to example embodiments of the disclosure, there may be a method. The method may include: transmitting a polling request to a plurality of routers forming a plurality of data flow paths between a plurality of network devices in a network; responsive to the polling request, receiving status information from one or more of the plurality of routers; identifying, based at least in part on the received status information, a rerouting event associated with a first data flow over a first data flow path among the plurality of data flow paths; selecting a second data flow path from among the plurality of data flow paths, based on one or more path selection criteria, for the first data flow; and initiating rerouting the first data flow over the second data flow path. In example embodiments, routing the first data flow over the second data flow path results in reduced latency compared to routing the first data flow over the first data flow path. In further example embodiments, the rerouting event may be a network congestion event. In still further example embodiments, the status information may include a first time/byte count from a first router of the plurality of routers and the one or more path selection criteria may include comparing the first time/byte count to a time/byte count threshold associated with the first data flow path. In some further example embodiments, the one or more path selection criteria may include a data transmission type associated with the first data flow. In some further example embodiments, the data transmission type may be determined from a packet header for a data packet in the first data flow. In some further example embodiments, the data transmission type comprises at least one of video data, web data, business data and voice data.

According to example embodiments of the disclosure, there may be one or more non-transitory machine-accessible media having stored thereon instructions that, when executed by one or more machines, cause the one or more machines to perform the operations comprising: transmitting a polling request to a plurality of routers forming a plurality of data flow paths between a plurality of network devices in a network; responsive to the polling request, receiving status information from one or more of the plurality of routers; identifying, based at least in part on the received status information, a rerouting event associated with a first data flow over a first data flow path among the plurality of data flow paths; selecting a second data flow path from among the plurality of data flow paths, based on one or more path selection criteria, for the first data flow; and initiating rerouting the first data flow over the second data flow path. In example embodiments, routing the first data flow over the second data flow path results in reduced latency compared to routing the first data flow over the first data flow path. In further example embodiments, the rerouting event may be a network congestion event. In still further example embodiments, the status information may include a first time/byte count from a first router of the plurality of routers and the one or more path selection criteria may include comparing the first time/byte count to a time/byte count threshold associated with the first data flow path. In some further example embodiments, the one or more path selection criteria may include a data transmission type associated with the first data flow. In some further example embodiments, the data transmission type may be determined from a packet header for a data packet in the first data flow. In some further example embodiments, the data transmission type comprises at least one of video data, web data, business data and voice data.

What is claimed is:

1. A system, comprising:
   at least one memory for storing computer-executable instructions; and
   one or more processors configured to access the at least one memory and execute the computer-executable instructions to:
      transmit a polling request to a plurality of routers forming a plurality of data flow paths between a plurality of network devices in a network;
      responsive to the polling request, receive status information from one or more of the plurality of routers;
      identify, based at least in part on the received status information, a rerouting event associated with a first data flow over a first data flow path among the plurality of data flow paths;
      select a second data flow path from among the plurality of data flow paths, based on one or more path selection criteria, for the first data flow; and
      initiate rerouting the first data flow over the second data flow path.

2. The system of claim 1, wherein routing the first data flow over the second data flow path results in reduced latency compared to routing the first data flow over the first data flow path.

3. The system of claim 1, wherein the rerouting event comprises a network congestion event.

4. The system of claim 1, wherein the status information comprises a first time/byte count from a first router of the plurality of routers, and wherein the one or more path selection criteria comprises comparing the first time/byte count to a time/byte count threshold associated with the first data flow path.

5. The system of claim 1, wherein the one or more path selection criteria comprises a data transmission type associated with the first data flow.

6. The system of claim 5, wherein the data transmission type is determined from a packet header for a data packet in the first data flow.

7. The system of claim 5, wherein the data transmission type comprises at least one of video data, web data, business data and voice data.

8. A method, comprising:
   transmitting a polling request to a plurality of routers forming a plurality of data flow paths between a plurality of network devices in a network;
   responsive to the polling request, receiving status information from one or more of the plurality of routers;
   identifying, based at least in part on the received status information, a rerouting event associated with a first data flow over a first data flow path among the plurality of data flow paths;
   selecting a second data flow path from among the plurality of data flow paths, based on one or more path selection criteria, for the first data flow; and
   initiating rerouting the first data flow over the second data flow path.

9. The method of claim 8, wherein routing the first data flow over the second data flow path results in reduced latency compared to routing the first data flow over the first data flow path.

10. The method of claim 8, wherein the rerouting event comprises a network congestion event.

11. The method of claim 8, wherein the status information comprises a first time/byte count from a first router of the plurality of routers, and wherein the one or more path selection criteria comprises comparing the first time/byte count to a time/byte count threshold associated with the first data flow path.

12. The method of claim 8, wherein the one or more path selection criteria comprises a data transmission type associated with the first data flow.

13. The method of claim 12, wherein the data transmission type is determined from a packet header for a data packet in the first data flow.

14. The method of claim 12, wherein the data transmission type comprises at least one of video data, web data, business data and voice data.

15. One or more non-transitory machine-accessible media having stored thereon instructions that, when executed by one or more machines, cause the one or more machines to perform the operations comprising:
   transmitting a polling request to a plurality of routers forming a plurality of data flow paths between a plurality of network devices in a network;
   responsive to the polling request, receiving status information from one or more of the plurality of routers;
   identifying, based at least in part on the received status information, a rerouting event associated with a first data flow over a first data flow path among the plurality of data flow paths;
   selecting a second data flow path from among the plurality of data flow paths, based on one or more path selection criteria, for the first data flow; and
   initiating rerouting the first data flow over the second data flow path.

16. The one or more non-transitory machine-accessible media of claim 15, wherein routing the first data flow over the second data flow path results in reduced latency compared to routing the first data flow over the first data flow path.

17. The one or more non-transitory machine-accessible media of claim 15, wherein the rerouting event comprises a network congestion event.

18. The one or more non-transitory machine-accessible media of claim 15, wherein the status information comprises a first time/byte count from a first router of the plurality of routers, and wherein the one or more path selection criteria comprises comparing the first time/byte count to a time/byte count threshold associated with the first data flow path.

19. The one or more non-transitory machine-accessible media of claim 15, wherein the one or more path selection criteria comprises a data transmission type.

20. The one or more non-transitory machine-accessible media of claim 19, wherein the data transmission type is determined from a packet header for a data packet in the first data flow.

21. The one or more non-transitory machine-accessible media of claim 19, wherein the data transmission type comprises at least one of video data, web data, business data and voice data.

* * * * *